UNITED STATES PATENT OFFICE 2,290,070

MANUFACTURE OF TECHNICAL POTASSIUM PYROANTIMONATE

Hartmut Richter, Rahway, N. J.

No Drawing. Application October 13, 1941,
Serial No. 414,887

16 Claims. (Cl. 23—53)

This invention relates to manufacture of technical potassium pyroantimonate; and it comprises a process of making a technical or commercial grade of potassium pyroantimonate, corresponding substantially to the formula $$Sb_2O_5 \cdot K_2O \cdot XH_2O$$

which comprises mixing together antimony trioxide, potassium hydroxide and a suitable oxidizing agent, such as potassium nitrate, fusing the mixture, leaching the fused product with water, seeding the resulting solution, heating it, without increasing its concentration substantially beyond 700 grams per liter, and recovering the resulting precipitate, the seeding being accomplished advantageously by leaving in the solution the insoluble residues from the leaching step, the quantity of potassium hydroxide employed usually not substantially exceeding the quantity required to produce a fused product which is substantially completely soluble in water; all as more fully hereinafter set forth and as claimed.

The term "potassium pyroantimonate" has been applied in the art to compounds containing $K_2O$ and $Sb_2O_5$, usually in approximately equimolecular proportions, while containing $H_2O$ in varying amounts. The usual formula given for this compound is $K_2H_2Sb_2O_7 \cdot 4H_2O$, corresponding to potassium dihydropyroantimonate. The selling price of the chemically pure compound is, of course, prohibitive for industrial purposes and there has long been a demand for a cheaper commercial product. The present invention is believed to afford a solution for this problem.

It has long been known that antimony in the form of its trioxide can be oxidized to the pentavalent form by fusion with an oxidizing agent such as a nitrate or a chlorate. Such products are to some extent soluble in water, but the solubility is enhanced if there is also caustic potash present in the fusion mixture.

I have found that the described fusion step can be conducted satisfactorily when the caustic potash in the fusion mixture is present in the proportions of about 1 to 5 parts by weight to 1 part of antimony trioxide but, if the caustic is maintained within the narrower range of about 1.25 to 1.75 parts to 1 part of the trioxide, fusion products will be obtained which have a maximum solubility. From these fusion products solutions containing 300 grams per liter or more of antimony can be prepared and these fusion products are substantially completely soluble in water. Generally speaking, the less the caustic employed, the more concentrated the water solution of the reaction product which can be prepared and good practice therefore dictates that such amounts be used as will give the best over-all results, keeping such possibilities as re-use of the excess caustic etc. in mind.

The temperature required in the fusion step is at least about 400° C. and it is best to conduct the reaction at temperatures within the range of about 450 to 650° C. Even higher temperatures are permissible but offer no particular advantage except that a smaller amount of caustic can be used in the mix.

It is necessary, of course, to add to the fusion mixture sufficient oxidizing agent to oxidize the antimony to its pentavalent form. For this purpose I have found that about 0.25 to 0.35 part of potassium nitrate or chlorate per part of antimony trioxide is sufficient. I have obtained best results with fusion mixtures containing about 1½ parts of KOH and 0.3 part of $KNO_3$ per part of antimony trioxide this mixture being heated to a temperature of about 450 to 500° C. In this manner, yields of 86 per cent or over can be obtained and the resulting product is 96 per cent or more soluble in water.

By leaching the fusion product with water there results an antimony bearing liquor from which antimony values can be recovered by several methods. One method comprises evaporating the solution to the point at which precipitation occurs. Such a procedure, however, involves much evaporation and the resulting product does not have the desired antimony content while containing a great deal of caustic potash which cannot be removed by washing without incurring high antimony losses. I have found, however, that a product which contains antimony in more nearly theoretical proportions can be obtained from such solutions by a novel procedure which is both simple and economical.

For the sake of economy both as to future evaporation for caustic recovery as well as for a good yield of the desired product, I make as concentrated a solution as possible, say one that contains about 300 grams per liter of antimony. This solution is then heated, advantageously without filtration, and without substantial loss of water for a period of time, say from ½ to 4 hours. Heating may be at 60° C. or at the boiling point, the latter being preferred since precipitation occurs more rapidly at boiling temperatures. Heating at still higher temperatures and under pressure may also be employed if desired.

During this heating period a granular precipitate is formed which settles rapidly and which may be then filtered off and washed with water or alcohol for the removal of excess caustic.

The volume of the liquor during the heating and precipitation may be kept constant but it may also be allowed to decrease somewhat after precipitation has commenced. A reflux condenser can be used to prevent loss of water by evaporation or water may be added from time to time as it is lost. But care must be taken that the increasing KOH concentration in the liquor does not in itself bring about precipitation, which results in the production of a compound low in antimony and high in caustic, as has previously been pointed out. The critical concentration above which the low-antimony compound tends to separate, corresponds to about 700 grams per liter of KOH, depending somewhat on the temperature and conditions of heating. In other words the solution should not be concentrated above about 700 grams per liter of KOH if precipitation of the low-antimony compound is to be avoided. For best results the concentration should be maintained within the range of about 400 to 600 grams per liter of KOH.

It has been noted that this newly discovered phenomenon of precipitation upon heating without dependence on evaporation, i. e. without increase of concentration, occurs in solutions which have not been clarified. When they have been clarified, such solutions may be boiled for hours without the appearance of a substantial precipitate unless they are seeded. It is only in the presence of a seed, such as exists in the unfiltered solutions, that precipitation occurs. This is shown by the following example.

Upon dissolving in water a quantity of fusion product, obtained by fusing together potassium hydroxide, potassium nitrate and antimony trioxide, a solution of the following composition was obtained:

| | Grams per liter |
|---|---|
| Sb | 250 |
| KOH | 380 | one-half of this solution was filtered and boiled at constant volume whereas the other half was boiled at constant volume without previous filtration. At the end of 3 hours a substantial granular precipitate had formed in the unfiltered solution and the antimony content had decreased to 26 grams per liter whereas the antimony content of the filtered solution remained unchanged.

I have found that the same desired precipitation may be brought about by the addition of seed crystals, resulting from a previous precipitation, to a filtered solution of the fusion product. This indicates that the results produced in the unfiltered solution is due to the presence of seed crystals of the final product in these solutions. It appears that the fusion product contains minute crystals of the compound which is later obtained as a granular precipitate and that these crystals serve as focci of crystallization in the precipitation step. Whatever the true explanation, of course, the facts remain as stated. The following example represents the use of seed crystals to bring about the desired precipitation.

One kilogram of the fusion product, obtained by fusing together caustic potash, potassium nitrate and antimony trioxide, was dissolved in 900 cc. of water to yield a solution of the approximate composition:

| | Grams per liter |
|---|---|
| Sb | 300–320 |
| KOH | 500–520 |
| $K_2CO_3$ | 40 |
| $KNO_3$ | 30 |

A portion of this solution was boiled without filtration for three hours at the end of which time a practically complete precipitation had taken place. The precipitate was filtered off on a suction filter and sufficient of this wet precipitate was added to 225 cc. of the original solution, after filtration, to produce a volume of 250 cc. This solution containing the seed crystals was then heated. Precipitation began promptly and at the end of four hours 80 per cent of the antimony content of the solution had precipitated.

My invention may be described in somewhat greater detail by reference to the following specific embodiment which represents a practical operation of my process in all its phases. In this operation 15 pounds of technical KOH were melted in a nickel crucible over an open flame and in it was dissolved 1 pound of potassium nitrate. The temperature was then raised to about 400° C. and 10 pounds of antimony trioxide were slowly introduced into the mixture and heating was continued until a fluid mix had been obtained. Then, an additional 2 pounds of potassium nitrate were added in small portions, each addition causing a vigorous reaction accompanied by a rise in temperature. All this time, exterior heating was also continued. At the end of the nitrate addition, the temperature reached 450° C. and the mixture had asumed the consistency of a crumbly mass which was removed from the fire and allowed to cool. It had a pea green color. After standing overnight, 3 gals. of water were added which caused the mass to dissolve quickly and the liquor to come to a boil. The solution had an antimony content of over 200 grams per liter. Boiling was continued for 4 hours, the volume being kept substantially the same. At the end of the first hour a sandy precipitate began to appear and after four hours the antimony content of the liquor was reduced to 30 grams per liter.

After cooling, the precipitate was filtered off on a suction filter and washed with 5 qts. of cold water. Then it was dried at 120° C. The yield was 15 pounds, 3 ounces of a product having the following composition:

| | Per cent |
|---|---|
| $Sb_2O_5$ | 66.9 |
| $Sb_2O_3$ | .2 |
| $K_2O$ | 20.8 |
| $H_2O$ | 11.9 | which corresponds substantialy to the formula $$1Sb_2O_5 \cdot 2K_2O \cdot 3H_2O.$$

The lack of 1 molecule of water is attributable to a dewatering effect produced by the elevated drying temperature. If drying is conducted at 100° C. or below, the formula of the compound obtained corresponds substantially to that of dihydropyroantimonate.

The product obtained by the above procedure was substantially completely soluble in boiling water producing a solution having a concentration of about 60 to 70 grams per liter of antimony. The composition of the solution did not change appreciably on cooling to room temperature. It will be seen that the product contains somewhat more $K_2O$ than is required to satisfy the 1:1 ratio between $K_2O$ and $Sb_2O_5$. By more careful washing, that is to say, by repeated re-slurring with fresh water it is possible to remove the excess caustic more completely. In one instance I obtained a product analyzing as follows after drying at 100° C.:

|  | Per cent | Theoretical for $1Sb_2O_5$. $1K_2O$. $4H_2O$ Per cent |
| --- | --- | --- |
| $Sb_2O_5$ | 65.8 | 66.6 |
| $K_2O$ | 20.1 | 19.3 |
| $H_2O$ | 14.7 | 14.1 |
|  | 100.6 | 100.0 |

While I have described what I consider to be the most advantageous embodiments of my invention, it is obvious, of course, that many modifications can be made in the specific procedures described without departing from the scope of this invention. The best procedure to be followed depends, of course, upon the purity of the product desired and certain economic considerations.

If it is desired to obtain preparations which are free from unreacted antimony trioxide, this can be accomplished by filtering the leach liquor, obtained by dissolving the fusion mixture or by decanting the leach liquor from the residues remaining after leaching, followed by seeding and heating to obtain the desired precipitate. In the fusion step of my process it is possible to fuse the caustic potash before adding the oxidizing agent and the caustic potash or these ingredients may be mixed in the dry state before fusion. If it is desired to reduce the violence of the fusion reaction it is possible to accomplish this by the addition of some of the fusion product obtained in a prior operation. Any oxidizing agent can be employed which is capable of oxidizing the antimony trioxide to pentoxide and which will not contaminate the final product. It is convenient to employ a solid, oxidizing potassium compound, such as potassium nitrate, chlorate or peroxide. My product can be prepared from antimony pentoxide or from mixtures of the trioxide and pentoxide, if desired. In this case the fusion step is conducted in the same manner as described above with the exception that the oxidizing agent is omitted or reduced in quantity. The potash and residual antimony remaining in the leach liquor, after the pyroantimonate has been removed by precipitation and filtration, can be recovered, if desired, by evaporation to dryness and may then be returned to the fusion step of another operation. Other modifications of my process will be immediately evident to those skilled in the art.

What I claim is:

1. In the manufacture of potassium pyroantimonate, the process which comprises fusing and reacting together antimony oxide and caustic potash, sufficient oxidizing agent being present to oxidize any antimony trioxide present to the pentavalent form, leaching the fused mass with water to form a concentrated leach liquor, heating the said leach liquor under conditions preventing the concentration of caustic potash from rising substantially above about 700 grams per liter and in the presence of suspended seed, whereby a granular precipitate of potassium pyroantimonate is obtained, and recovering the resulting precipitate.

2. In the manufacture of potassium pyroantimonate, the process which comprises fusing antimony trioxide, potassium hydroxide and an oxidizing potassium compound in admixture, for a time sufficient to complete the resulting reaction, leaching the fused mass with water, heating the resulting leach liquor under conditions preventing the concentration of potassium hydroxide from rising substantially above about 700 grams per liter and in the presence of suspended seed, whereby a granular precipitate of potassium pyroantimonate is obtained, and recovering the said precipitate.

3. The process of claim 2 wherein said suspended seed constitute the residues of said fused mass suspended in said leach liquor.

4. The process of claim 2 wherein said suspended seed constitute a portion of the granular precipitate recovered from a prior operation of the process.

5. The process of claim 2 wherein the potassium hydroxide and the antimony trioxide are employed in proportions within the range of about 1 to 5 parts by weight of potassium hydroxide to 1 part of antimony oxide.

6. The process of claim 2 wherein approximately 1½ parts by weight of potassium hydroxide are employed for each part of antimony trioxide.

7. The process of claim 2 wherein the oxidizing compound is potassium nitrate employed in amount ranging from about 0.25 to 0.35 part by weight to each part of antimony trioxide.

8. The process of claim 2 wherein the leach liquor, after recovery of the precipitated potassium pyroantimonate, is evaporated to dryness and the residues are returned to the fusion step of a subsequent operation.

9. The process of claim 2 wherein the temperatures reached during said fusion step are within the range of about 400 to 650° C.

10. The process of claim 2 wherein the oxidizing potassium compound employed is potassium nitrate.

11. The process of claim 2 wherein the oxidizing potassium compound employed is potassium chlorate.

12. The process of claim 2 wherein the oxidizing potassium compound employed is potassium peroxide.

13. The process of claim 2 wherein the oxidizing compound employed is potassium nitrate employed in quantities amounting to about 0.25 to 0.35 part per part of antimony oxide, the potassium hydroxide being employed in quantities amounting to from about 1 to 5 parts per part of antimony oxide.

14. In the manufacture of potassium pyroantimonate, the process which comprises fusing antimony trioxide, potassium hydroxide and potassium nitrate in admixture, the proportions of potassium hydroxide and antimony trioxide in said mixture being within the range of about 1 to 5 parts by weight of potassium hydroxide to 1 part by weight of antimony trioxide, sufficient potassium nitrate being present to oxidize the antimony to its pentavalent state, leaching the fused product with water to produce a concentrated leach liquor and, without removing insoluble suspended particles of said fused product, heating the resulting leach liquor to elevated temperatures without substantial reduction in its water content, whereby a granular precipitate of potassium pyroantimonate is produced, and recovering the resulting precipitate.

15. In the manufacture of potassium pyroantimonate, the process which comprises fusing antimony trioxide, potassium hydroxide and potassium nitrate in admixture, the proportions of potassium hydroxide and antimony trioxide in said mixture being within the range of about 1 to 5 parts by weight of potassium hydroxide to 1 part by weight of antimony oxide, sufficient potassium nitrate being present to oxidize the antimony to its pentavalent state, leaching the fused product with water to produce a concentrated leach liquor, removing any solid leaching residues from the liquor, seeding the liquor with crystals obtained from a prior operation, boiling said leach liquor without substantial reduction in its water content, and recovering the resulting precipitate.

16. In the manufacture of potassium pyroantimonate, the process which comprises fusing together from about 1 to 5 parts of potassium hydroxide, 1 part of antimony trioxide and from 0.25 to 0.35 part of potassium nitrate, the fusion mass being heated to temperatures within the range of about 400 to 650° C., leaching the fused mass with the minimum quantity of water required to dissolve the same, heating the leach liquor in the presence of suspended seed to temperatures not substantially exceeding the boiling point of the liquor, whereby a granular precipitate of potassium pyroantimonate is produced, and recovering the resulting precipitate.

HARTMUT RICHTER.